United States Patent
Bohra et al.

(10) Patent No.: US 9,901,977 B2
(45) Date of Patent: Feb. 27, 2018

(54) PATTERNLESS SAND MOLD AND CORE FORMATION FOR RAPID CASTING

(71) Applicant: Western Michigan University Research Foundation, Kalamazoo, MI (US)

(72) Inventors: Hemant Bohra, Kalamazoo, MI (US); Sam N. Ramrattan, Kalamazoo, MI (US); Margaret K. Joyce, Kalamazoo, MI (US); Paul D. Fleming, III, Kalamazoo, MI (US); Pavel Ikonomov, Portage, MI (US)

(73) Assignee: The Board of Trustees of Western Michigan University, Kalamazoo, MI (US)

( * ) Notice: Subject to any disclaimer, the term of this patent is extended or adjusted under 35 U.S.C. 154(b) by 105 days.

(21) Appl. No.: 14/652,026

(22) PCT Filed: Dec. 12, 2013

(86) PCT No.: PCT/US2013/074776
§ 371 (c)(1),
(2) Date: Jun. 12, 2015

(87) PCT Pub. No.: WO2014/093684
PCT Pub. Date: Jun. 19, 2014

(65) Prior Publication Data
US 2015/0321246 A1     Nov. 12, 2015

Related U.S. Application Data

(60) Provisional application No. 61/737,204, filed on Dec. 14, 2012.

(51) Int. Cl.
*B22C 9/02* (2006.01)
*B22C 1/22* (2006.01)
*B29C 64/153* (2017.01)

(52) U.S. Cl.
CPC .................. *B22C 9/02* (2013.01); *B22C 1/22* (2013.01); *B22C 1/2253* (2013.01); *B29C 64/153* (2017.08); *Y02P 10/292* (2015.11)

(58) Field of Classification Search
CPC B22C 9/02; B22C 9/12; B22C 1/2253; B22C 1/22; B22C 19/00
See application file for complete search history.

(56) References Cited

U.S. PATENT DOCUMENTS 5,094,289 A    3/1992   Gentry
5,215,143 A    6/1993   Gentry
(Continued)

FOREIGN PATENT DOCUMENTS

CN     102397991 A    4/2012
EP      0476966 A1    3/1991
(Continued)

OTHER PUBLICATIONS

Clausen, Clare. "Carbon sand: a nonsilica, round-grain carbon." The Free Library Aug. 1, 1992. Accessed Apr. 2, 2017. <https://www.thefreelibrary.com/Carbon sand: a nonsilica, round-grain carbon.-a012624877>.*

(Continued)

*Primary Examiner* — Kevin P Kerns
*Assistant Examiner* — Steven Ha
(74) *Attorney, Agent, or Firm* — Price Heneveld LLP

(57) ABSTRACT

A method of creating a sand mold for rapid casting, including the steps of determining a mold shape, providing a generally uniform thickness layer of sand, curing at least a portion of the layer of sand, machining the cured portions of the layer of sand based on the desired mold shape, and repeating the layer-forming, curing and machining steps until the sand mold is complete. Another aspect includes a machine for creating the sand mold having a build envelope (Continued)

defined by side walls, a movable build platform and at least one movable tool assembly, the movable tool assembly having a single or plurality of tools chosen from the group consisting of a sand dispenser, a sand leveling device, a curing device, and a machining device.

16 Claims, 3 Drawing Sheets

(56) References Cited

U.S. PATENT DOCUMENTS

| | | | |
|---|---|---|---|
| 5,718,279 | A | 2/1998 | Satoh et al. |
| 6,048,954 | A | 4/2000 | Barlow et al. |
| 6,259,962 | B1 | 7/2001 | Gothait |
| 6,386,264 | B2 | 5/2002 | Gustafson |
| 6,569,373 | B2 | 5/2003 | Napadensky |
| 6,658,314 | B1 | 12/2003 | Gothait |
| 6,850,334 | B1 | 2/2005 | Gothait |
| 7,025,108 | B2 | 4/2006 | Hentschel et al. |
| 7,070,734 | B2 | 7/2006 | Liu et al. |
| 7,267,876 | B2 | 9/2007 | Okubo et al. |
| 7,448,433 | B2 | 11/2008 | Ortiz et al. |
| 7,461,684 | B2 | 12/2008 | Liu et al. |
| 7,517,492 | B2 | 4/2009 | Liu |
| 7,958,841 | B2 | 6/2011 | Kritchman et al. |
| 8,020,604 | B2 | 9/2011 | Hocksmann |
| 8,211,226 | B2 | 7/2012 | Bredt et al. |
| 2002/0041818 | A1 | 4/2002 | Abe et al. |
| 2002/0062909 | A1 | 5/2002 | Jang et al. |
| 2004/0099983 | A1 | 5/2004 | Dirscherl |
| 2004/0107019 | A1 | 6/2004 | Keshavmurthy et al. |
| 2005/0017394 | A1* | 1/2005 | Hochsmann ........ B29C 67/0081 264/113 |
| 2005/0280185 | A1 | 12/2005 | Russell et al. |
| 2010/0043698 | A1 | 2/2010 | Bolt |
| 2010/0168890 | A1 | 7/2010 | Fisher et al. |
| 2011/0108232 | A1 | 5/2011 | Cannon et al. |
| 2012/0266815 | A1 | 10/2012 | Brunermer |

FOREIGN PATENT DOCUMENTS

| | | |
|---|---|---|
| EP | 0554033 B1 | 8/1993 |
| EP | 0776713 A2 | 6/1997 |
| EP | 1949989 A1 | 7/2008 |
| EP | 2581154 A1 | 4/2013 |
| JP | 04251629 A | 9/1992 |
| JP | 09168840 A | 6/1997 |
| WO | 2011155567 A1 | 12/2011 |

OTHER PUBLICATIONS

Bohra et al., "Evaluation of a 3D Light Cured Sand for Rapid Casting Technology," AFS Transactions 13-1456, 2014, 10 pages.
Bohra et al., "Quantitative Method for Determining the Level of Cure and Wall Thickness in Shell Sand Systems," AFS Transactions 15-090, 2015, 6 pages.
Bassoli et al., "3D printing technique applied to rapid casting," Journal, 2007, 11 pages.
Beaudoin et al., "Direct Shell Sand Rapid Prototyping: From CAD to Casting in Days," Modern Casting, Nov. 1997, 4 pages.
Bernard et al., "Integration of CAD and rapid manufacturing for sand casting optimisation," Journal, 2003, 9 pages.
Hemant Bohra, "Integrating 3D Layered Manufacturing With Photonic Sintering, Precision Machining and Smart Coating Techniques for Rapid Casting Applications," Western Michigan University, 2014, 193 pages.
Chea et al., "Rapid prototyping and tooling techniques: a review of applications for rapid investment casting," Article, Aug. 11, 2004, 13 pages.
Chhabra, Singh, "Rapid casting solutions: a review," Journal, 2010, 25 pages.
Grote, Antonsson, "Mechanical Engineering Handbook," 2009, 1589 pages.
Karunakaran, et al., "Low cost integration of additive and subtractive processes for hybrid layered manufacturing," 2010, 10 pages.
Xiong et al., "A new method of direct metal prototyping: hybrid plasma deposition and milling," Journal, 2008, 5 pages.
Knights, Mikell, "Hybrid Prototyping Process Combines Casting & Machining," Plastics Technology, Oct. 2005, 3 pages.
Kochan et al., "Rapid prototyping issues in the 21st. century," Computers in Industry, 1999, 8 pages.
Kruth et al., "Consolidation phenomena in laser and powder-bed based layered manufacturing," 36th International MATADOR Conference Proceeding, 2007, 30 pages.
Levy et al., "Rapid Manufacturing and Rapid Tooling With Layer Manufacturing (LM) Technologies, State of the Art and Future Perspectives," CIRP Annals-Manufacturing Technology, 2003, 21 pages.
Liou, "Applications of a hybrid manufacturing process for fabrication of metallic structures," Materials and Manufacturing Directorate, Air Force Research Laboratory, 2006, 11 pages.
Brian Rooks, "Rapid tooling for casting prototypes," Assembly Automation, vol. 22, Issue 1, 2002, 8 pages.
Ahamad et al., "Thermal degradation and evolved gas analysis of epoxy (DGEBA)/novolac resin blends (ENB) during pyrolysis and combustion," Journal for Thermal Analysis and Calorimetry, 2012, 7 pages.
Shannon Wetzel, "Offering Customers Rapid Manufacturing," Modern Casting, 2012.
Kerschbaumer, "Hybrid Manufacturing Process for Rapid High Performance Tooling Combining High Speed Milling and Laser Cladding," 23rd International Congress on Applications of Lasers & Electro-Optics 2004, 10 pages.
Boivie, Klas; Dolinsek, Slavko; Homar, David, "Hybrid Manufacturing: Integration of Technologies for Competitive Production of Complex Tools and products," 15th International Research/Expert Conference "Trends in Development of Machinery and Associated Technology", Sep. 12-18, 2011, Prague, Czech Republic, 4 pages.
Hur, Junghoon; Lee, Kunwoo; Kim, Jongwon, "Hybrid rapid prototyping system using machining and deposition," Computer-Aided Design, vol. 34, 2002, 14 pages.
Wang, X. H.; Fuh, J. Y. H.; Wong, Y. S.; Tang, Y. X., "Laser Sintering of Silica Sand—Mechanism and Application to Sand Casting Mold," The International Journal of Advanced Manufacturing Technology, 2003, 6 pages.
Tatiana Koutchma, "UV Light for Processing Foods," IUVA news, vol. 10 No. 4, Dec. 2008, 6 pages.
Brensons, Ilmars; Mozga, Natalija, Research on Rapid Prototyping Influence in Manufacturing Technology, 15th International Research/Expert Conference "Trends in Development of Machinery and Associated Technology", Sep. 12-18, 2011, Prague, Czech Republic, 4 pages.
Bacila, Carmen Gabriela; Baki-Hari, Zoltan-Gabor, "The Main Applications of Rapid Tooling," International Conference on Economic Engineering and Manufacturing Systems, Oct. 25-26, 2007, 5 pages.
Muhammad Fakhri Bin Zainuddin, "A Study on Mold Material and Coating Effect in Sand Casting Process," Faculty of Mechanical Engineering, Universiti Malaysia Pahang, Nov. 2009, 24 pages.
Pal, Lokendra; Joyce, Margaret K.; Fleming, Paul D., "A Simple Method for Calculation of the Permeability Coefficient of Porous Media," TAPPI Journal, Sep. 2006, 7 pages.
Liou, F.; Slattery, K.; Kinsella, M.; Newkirk, J.; Chou, H.; Landers, R., "Applications of a Hybrid Manufacturing Process for Fabrication and repair of Metallic Structures," Materials and Manufacturing Directorate, Air Force Research Laboratory, 2006, 11 pages.
Lever, T. J.; Price, D. M.; Warrington, S.B.; "Evolved Gas Collection from a Thermogravimetric Analyzer and Identification by Gas Chromatography-Mass Spectrometry," Proceedings of the Twenty-Eighth Conference of the North American Thermal Analysis Society, Orlando, Florida, Oct. 4-6, 2000, 6 pages.
Hammack, Richard W., "Evolved Gas Analysis—A Quick Method for Identifying Toxic Overburden Materials," Proceedings from the

(56) References Cited

OTHER PUBLICATIONS

Seventh Annual West Virginia Surface Mine Drainage Task Force Symposium, Morgantown, West Virginia, 1986, 13 pages.
International Searching Authority, International Search Report and Written Opinion for Application No. PCT/US2013/074776, dated Apr. 29, 2014, 8 pages.
Frank, Matthew C.; Peters, Frank E.; Luo, Xiaoming; Meng, Fanqi; Petrzelka, Joseph, "A Hybrid Rapid Pattern Manufacturing System for Sand Castings," Proceedings of the Solid Freeform Fabrication Symposium, Austin, Texas, 2009, 12 pages.
Samuels, Gregory; Beckermann, Christoph, "Measurement of Gas Evolution from PUNB Bonded Sand as a Function of Temperature," 65th SFSA Technical and Operating Conference Proceedings, 2011, 103 pages.
Bohra, H.; Ramrattan, S. N.; Joyce, M. K.; Fleming P. D.; Ikonomov, P., "New Light Cured Media for Use with cast Prototypes," International Conference on Agile Manufacturing Systems, Varanasi, India, 2012, 6 pages.
European Search Report, EP13861582, dated Apr. 19, 2016, 2 pages.

\* cited by examiner

PATTERNLESS SAND MOLD AND CORE FORMATION FOR RAPID CASTING

RELATED APPLICATIONS

This application is a national stage application under 35 U.S.C. § 371 of PCT Application No. PCT/US2013/074776, filed on Dec. 12, 2013, which claims priority under 35 U.S.C. § 119(e) to U.S. Provisional Patent Application No. 61/737,204, filed Dec. 14, 2012, entitled "SAND MOLDS FOR RAPID CASTING," which is herein incorporated by reference in its entirety.

FIELD OF THE INVENTION

The present invention generally relates to patternless sand mold and core formation for rapid casting of metals, and to a method for making such molds and cores.

BACKGROUND OF THE INVENTION

Metal casting can be explained as the process of pouring molten metal into a shaped cavity in order to transform it into a desired shape upon solidification. The primary step of this process is the creation of a mold having a shaped cavity to define the exterior shape of the casting. In addition, a core can be placed in the mold cavity to create an internal space of a defined shape in the casting. As used herein, "mold" includes both molds and cores used to shape the casting. Molds can be prepared using various heat resistant materials, including without limitation, sand, which provides the primary advantage of cost effectiveness. The molds can be classified as permanent or non-permanent. Non-permanent molds are destroyed to reveal the casted metal structure (e.g. sand molds). This step is referred to as the shakeout process. The casting process offers many advantages over other shaping processes. It is inexpensive and provides significant flexibility in form and material composition of the casts. Achieving net near shape and integral castings leads to the reduction in the time and costs associated with any additional machining and assembly requirements.

The properties of a casting can be established through the material and process parameters utilized during mold-making, treatment of the molten material prior to casting, chemical composition and characteristics of the casted material, the rate of solidification, and additional heat treatment after solidification.

The selection of the mold material and mold making process plays a vital role in the casting's characteristics. Sand, being a refractory material, can withstand very high metal pouring temperatures, which imparts the required dimensional stability at elevated temperatures. Sand also provides an economical advantage over other comparable refractory materials. Dry sand molding requires the introduction of a binder system to hold the loose sand particles during the mold shaping process. The finished mold's physical, chemical and thermo-chemical properties depend on the sand-binder system interactions and the process for creating the mold.

Mold formation can be divided into two categories: patterned and patternless. A patterned mold acquires its shape through the deposition of the mold material around a defined shaped object known as a pattern. The primary concern with patterned mold making is the cost and time involved in creating the pattern with the help of various machining and tooling activities. On the other hand, patternless molds can be created directly from a digital drawing or model through the implementation of additive or subtractive manufacturing techniques, and are valuable for creation of design prototypes and small-lot parts.

Additive manufacturing of molds, also known as layered manufacturing, has attained acceptance for rapid prototyping and rapid manufacturing, integrating computer aided manufacturing, and providing for rapid creation of complex mold shapes with high precision and tolerance levels. Rapid prototyping refers to the production of prototypes directly from a design. It is used for the product development phase of a production process because it is able to impart the characteristics in close proximity to the finished product, which enables the further investigation and analysis of the product before finalizing the end product features. The rapid casting process defines the integration of traditional metal casting techniques with additive manufacturing approaches to achieve either functional prototypes or end products.

Subtractive manufacturing techniques include traditional processes such as cutting, milling, grinding and drilling, which remove material from the mold to form a cavity, or in the case of a core, form the correct structure, or increase the precision of the mold.

Various rapid casting solutions have been developed during the last few decades to implement concurrent engineering approaches for the development of functional prototypes and customized production of metal castings for applications in various sectors of manufacturing industries. These rapid casting solutions include unique production approaches, such as selective laser sintering, fused deposition modeling, stereolithography, 3-D printing and rapid tooling.

SUMMARY OF THE INVENTION

In one aspect, the present invention includes a method of manufacturing a sand mold, including the steps of determining a desired mold shape, forming a first layer of sand, with the first layer having a generally uniform thickness. At least a portion of the first layer of sand is cured. Any portion of the first layer that is cured is a first cured portion and any portion of the first layer that is not cured is a first loose portion. The cured portion of the first layer is machined based on the desired mold shape to release sand from the first cured portion. The sand released from the first cured portion becomes part of the first loose portion. A second layer of sand having a generally uniform thickness is formed. The second layer is supported by the first layer of sand. The layer-forming, curing, and machining steps are repeated until the sand mold has the desired mold shape.

In another aspect, the present invention includes a device for manufacturing a sand mold. The device includes a build envelope defined by a plurality of side walls. A movable build platform is suspended above the build envelope and movable in a z-axis with respect to the build envelope. A sand dispenser is coupled to the movable build platform and is movable along at least an x-axis and a y-axis with respect to the movable build platform, wherein the x-axis and the y-axis are perpendicular to the z-axis. A curing light is coupled to the movable build platform and is movable along at least the x-axis and the y-axis with respect to the movable build platform. A machining tool is coupled to the movable build platform and is movable along at least the x-axis and the y-axis with respect to the movable build platform.

In another aspect, the present invention includes a sand mold for rapid casting, including a plurality of layers of thermosetting resin-coated carbon shell sand, wherein each layer of sand is individually deposited onto the sand mold, cured, and machined to form machined mold surfaces. A refractory coating is applied to the machined mold surfaces.

These and other features, advantages, and objects of the present invention will be further understood and appreciated by those skilled in the art by reference to the following specification, claims, and appended drawings.

DETAILED DESCRIPTION

Figure 2:
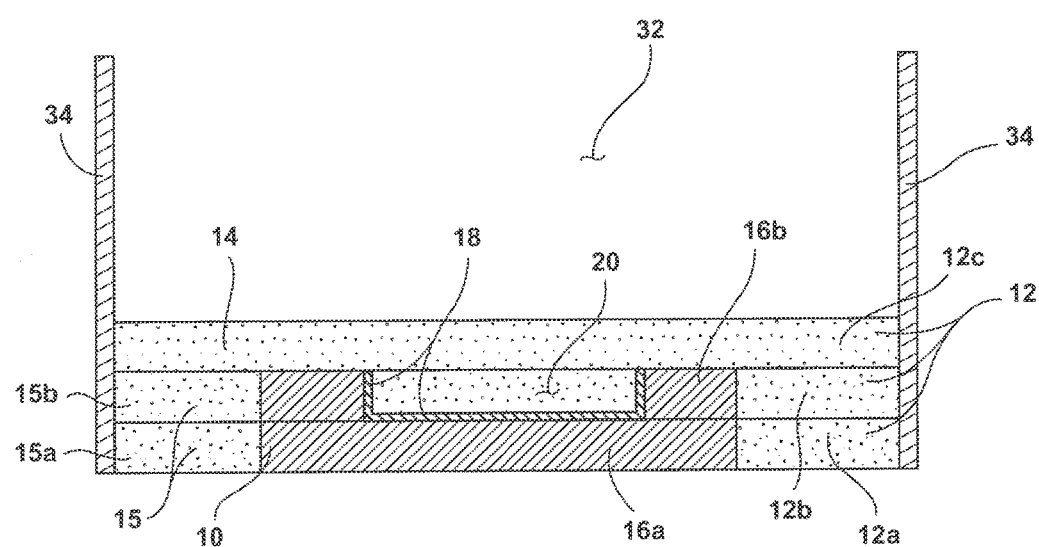
FIG. 2 is a cross sectional view of a build envelope with sand in the envelope for forming a mold.

For purposes of description herein, the terms "upper," "lower," "right," "left," "rear," "front," "vertical," "horizontal," and derivates thereof shall relate to the depiction as oriented in FIG. 2 unless stated otherwise. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The manufacturing process described herein involves an additive and subtractive layered manufacturing process, integrating layer deposition techniques and computer numerical control (CNC) machining, resulting in improved precision and accuracy, while exponentially increasing mold production speeds.

Figure 1:
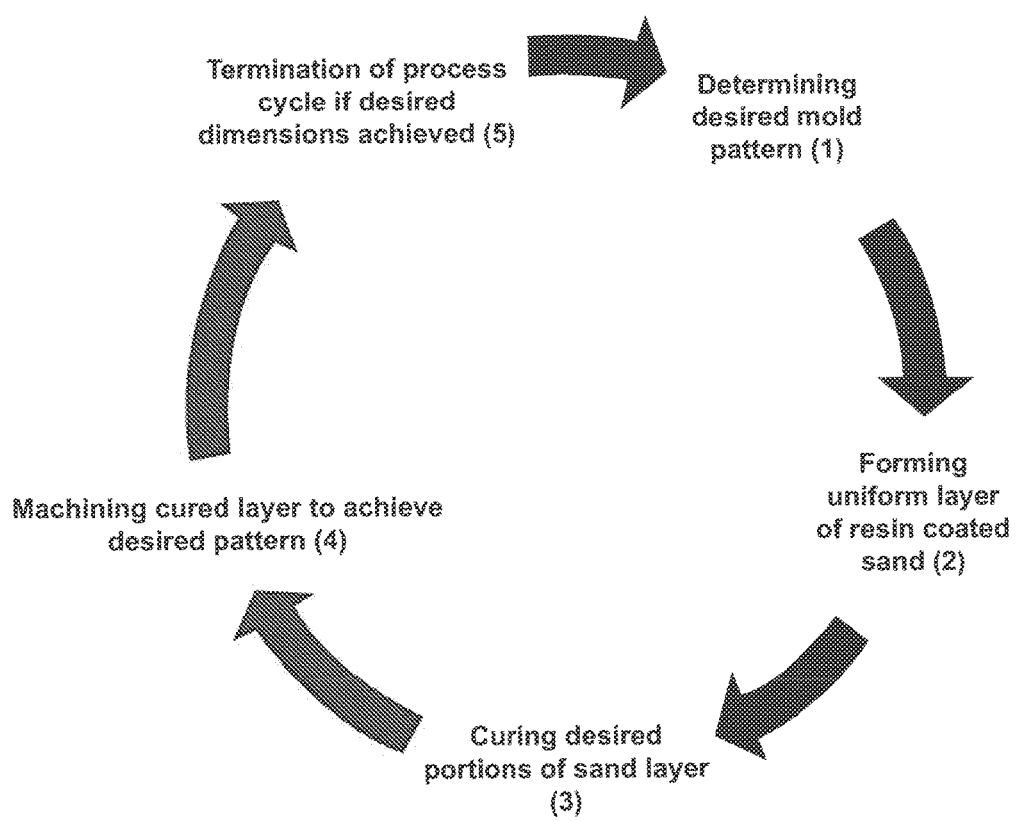
FIG. 1 is a chart showing the steps for production of a mold according to one aspect of the present invention.

Referring initially to FIGS. 1 and 2, the process of manufacturing a mold 10 includes the steps of determining a desired mold shape; forming a layer 12 of resin-coated sand 14, the layer 12 having a generally uniform thickness; curing the desired portions of the sand layer 12 to form a cured portion 16 and a loose portion 15; and machining first cured portion 16 to achieve the desired mold 10. If the desired sand mold 10 dimensions have been achieved, the process is terminated, and if the desired sand mold 10 dimensions have not been achieved, another layer 12 of sand 14 is deposited and the cycle continues. In one embodiment, a first layer 12a of sand 14 is formed having a generally uniform thickness. A portion of the first layer 12a of sand 14 is cured. The portion of the first layer 12a that is cured is a first cured portion 16a and the portion of the first layer 12a that is not cured is a first loose portion 15a. The first cured portion 16a is machined based on the desired mold shape to release sand 14 from the first cured portion 16a, and this released sand 14 becomes part of the first loose portion 15a. A second layer 12b of sand 14 having a generally uniform thickness is formed over the first layer 12a and is supported by the first layer 12a. The layer-forming, curing, and machining steps are repeated to form a second cured portion 16b and a second loose portion 15b, and supporting a third layer 12c on the second cured portion 16b and second loose portion 15b, etc. The process is repeated until the desired sand mold 10 has been created.

In additional embodiments, the sand 14 which is machined away from the sand mold 10 and the uncured sand 14 comprise loose sand 15. The loose sand 15 remains in place to support future sand layers 12 as they are deposited, and is removed after completion of the mold 10. In another embodiment, additional unbound sand 14 is added to the loose sand 15 to form a level layer to support the next layer of the sand mold 10. In another embodiment, the loose sand 15 is removed, and additional unbound sand 14 is added to the cured portion 16 to support future layers 12 as they are deposited. The additional unbound sand 14 optionally has a different composition than the cured portion 16 and the loose sand 15. For example, in certain embodiments the additional unbound sand 14 may not include a binding element or resin as described in greater detail below, so that the curing step carried out with future layers (e.g., 12b, 12c) does not cure the additional unbound sand 14.

Machined surfaces 18 of the mold 10 generally define mold cavities 20. Once the mold 10 has been completely formed, the unbound sand 14 and the sand 14 which has been released from the mold 10 by machining (together, loose sand 15) is emptied from the mold cavities 20, and, depending on the ultimate intended use of the mold, a refractory coating (not shown separately from the machined mold surfaces 18) may be applied to the mold 10, particularly the machined surfaces 18 of the mold 10 after the mold 10 is formed and the loose sand 15 is removed.

More specifically, the step of determining the desired mold design is carried out by creating a design for the mold 10 using CAD or other design software which can be used to communicate with a mold-making machine 30. Once the design is created, the production of the mold 10 is done directly from the computer program as described herein, without requiring the production of an intermediate pattern to physically stamp or shape the mold 10.

Figure 3:
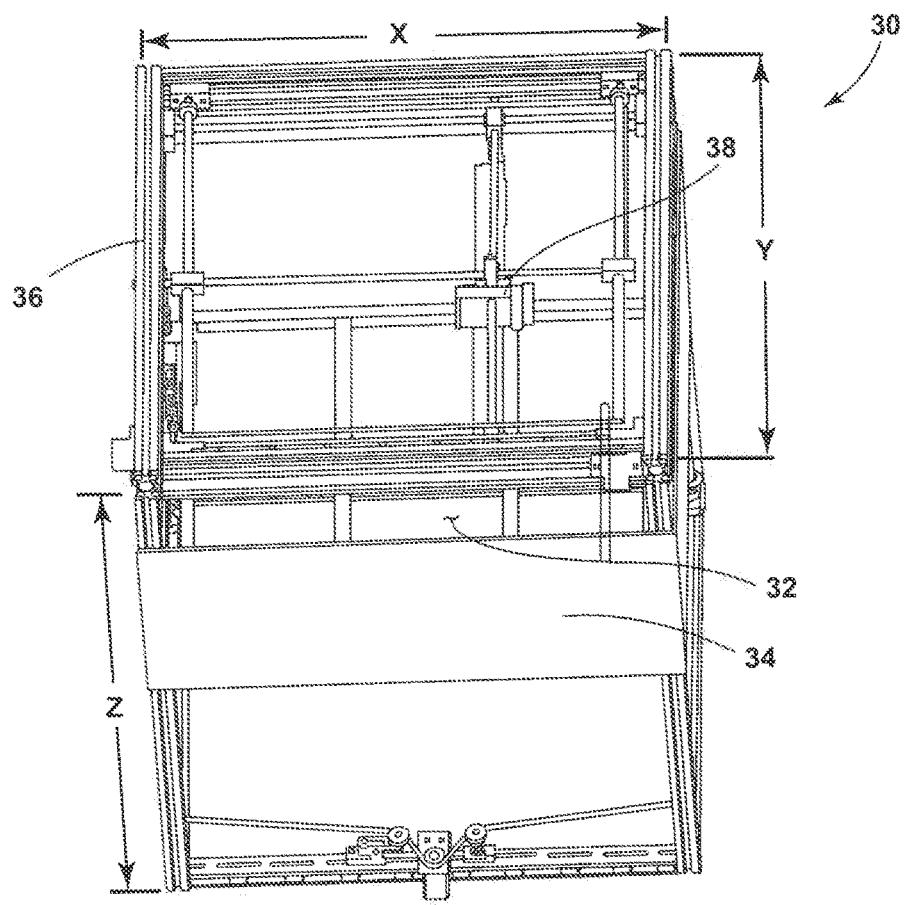
FIG. 3 is a top perspective view of an embodiment of a machine for manufacturing a mold according to another aspect of the present invention.
Figure 4:
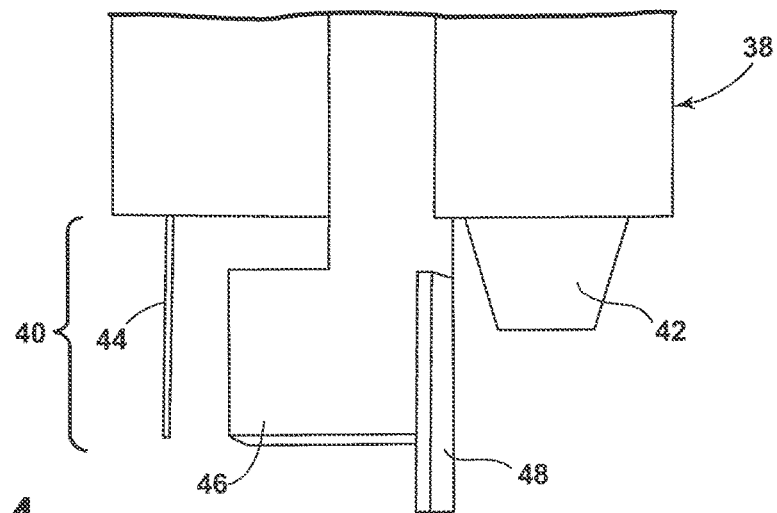
FIG. 4 is a side elevation view of an embodiment of a movable tool assembly for use in another aspect of the present invention.

As shown in FIGS. 3-4, a machine 30 to carry out the process described above includes a build envelope 32 defined by a set of sidewalls 34, a movable build platform 36 suspended above the build envelope 32, and at least one moving tool assembly 38 coupled to the movable build platform 36, wherein the moving tool assembly 38 or assemblies 38 comprise a plurality of tools 40, including a sand dispenser tool 42, a machining tool 44, and a curing light source 46. A sand leveling device 48 is also coupled to the tool assembly in certain embodiments, as shown in FIG. 4. In one aspect, the movable build platform 36 is movable along a z-axis (e.g., vertical), and the moving tool assembly 38 is coupled to the movable build platform 36 such that it can be moved along an x-axis and a y-axis with respect to the movable build platform 36, each of the x-axis and y-axis being perpendicular to the z-axis. In another embodiment, the movable build platform 36 is movable along a z-axis (e.g., vertical) and the moving tool assembly 38 is coupled to the movable build platform 36 such that it can be moved along an x-axis and a y-axis with respect to the movable build platform 36, each of the x-axis and y-axis being perpendicular to the z-axis, and also moved about a b-axis (around the x-axis) and a c-axis (around the y-axis).

When the machining tool 44 is coupled with the sand dispenser tool 42 and is movable in the x-axis and the y-axis, the accuracy and smoothness of the mold 10 is increased by applying and machining multiple thin layers of sand rather than applying and machining a single thick layer of sand. In another embodiment, the moving tool assembly 38 including a machining tool 44 is uncoupled from the build platform 36, such that the build platform 36 moves in the z-axis with respect to the machining tool 44 to attain greater machining accuracy of each layer. In another embodiment, the moving tool assembly 38 having a machining tool 44, or the machining tool 44 portion of the moving tool assembly 38 moves in the z-axis in addition to the x-axis and the y-axis to attain greater accuracy with thicker build layers. In another aspect the moving tool assembly 38 including a machining tool 44, or the machining tool 44 portion of the assembly 38, is movable in a b-axis (rotating around the x-axis) and c-axis (rotating around the y-axis) in addition to the x-axis, y-axis, and z-axis. This provides five-axis machining that efficiently machines accurate and smooth mold layers. In embodiments as described herein, tolerances of the final part range from 0.0001 inch to 0.5 inch.

The z-directional movement of the build platform 36 aids in controlling layer 12 thickness by defining the maximum possible layer 12 thickness. The xy-directional movement of the tool assembly 38 allows layer building, curing, and machining operations. Any or all of the z-axis, b-axis, or c-axis directional movement of the tool assembly 38 or machining tool 44 increases efficiency of machining operations on the layer 12 of sand. The sand dispenser 42 is used to dispense an amount of sand 14 into the build envelope 32. The height of the build platform 36 is then set at a desired height (z-direction), and the sand sweep bar 48 is moved horizontally (x- and y-direction) across the surface of the sand layer 12 to level the layer to the desired layer thickness. The moving tool assembly 38 is moved in the x- and y-directions to direct the light source 46 over the portions 16 of the layer 12, which are desired to be part of the mold 10, to cure those portions 16 of the layer 12 of sand 14 which are desired to be in the mold 10. Following all or a portion of the curing step, a machining tool 44 is moved horizontally (x- and y-direction) over the surface of the layer 12 of sand 14, and either the machining tool 44 or the build platform 36 is movable vertically (z-direction) to put the machining tool 44 in contact with the layer 12 of sand 14, to provide smoothing to the surfaces of the cured sand 16, and to perform any additional machining (such as that performed in traditional CNC machining). In alternate embodiments, the tool assembly 38 or the machining tool 44 are also movable in the b-axis (rotating about the x-axis) and the c-axis (rotating about the y-axis) to provide more exact smoothing and machining for difficult or complex surface shapes for the mold 10, as performed in five-axis CNC machining.

To create the mold 10, sand 14 is dispensed into a build envelope 32, and smoothed into a uniform layer 12. The layer 12 is typically less than about 18 mm thick, and preferably less than about 12 mm thick. The layer 12 of sand 14 is preferably between about 0.01 mm and about 18 mm thick, and more preferably between about 1 mm and about 12 mm thick. Various systems may be used to smooth the sand 14 into a generally uniform layer 12, some examples of which are provided below.

In one aspect, for obtaining the desired layer thickness of the sand 14 on top of the build platform 36, the sand 14 is delivered in powder form and spread using the sand dispenser 42 enclosed in the moving tool assembly 38. In another aspect, the sand 14 is delivered and spread as a dispersion using the sand dispenser 42 enclosed in the moving tool assembly 38. The sand dispenser 42 can be a gravity feed nozzle, pressurized feed nozzle, inkjet printer-like head, or other dispensing unit. Thereafter, to obtain an even layer thickness, excess sand 14 is removed using the sand leveling tool 48, which may comprise a brush or blading system. The leveling tool 48 may ride on the top edge of the plurality of sidewalls 34, or be coupled to the moving tool assembly 38. The sand leveling system 48 is optionally comprised of a pneumatic blading system, as used in various gravure printing or coating processes. Such a pneumatic blading system will maintain blade contact and apply blade pressure only at the time when sand 14 is dispensed from the sand dispenser 42.

In one embodiment, the sand 14 used to create the mold 10 is a thermosetting resin-coated carbon shell sand 14. The carbon shell sand 14 is used to enhance the heat transfer between the top of a layer 12 and the bottom of the layer 12 by its high heat absorption properties. Moreover, the carbon shell sand particles 14 are also easily machined due to the lubrication properties of graphite, allowing the cured layers 16 to be more readily machined allowing for higher precision. Additionally, carbon sand 14 is black, and efficiently absorbs light and heat. The carbon sand 14 is also less expensive and more readily available than many sands.

The bulk density of sand 14 plays a vital role in the estimation of the sand mold 10 properties from a handling and logistical prospective. Bulk density is also significant in tracking any lot-to-lot variations in the sand 14 employed. The density of the sand 14 is represented by its mass/volume ratio and can be measured by weighing a known volume of material and thereafter calculating the ratio.

The Grain Fineness Number ("GFN") is an indicator of the average grain size of a sample of sand 14. Though smaller grains of sand 14 are capable of imparting better surface finish, due to their closely packed structure, they hinder the venting characteristics of the mold 10 which can result in various casting defects. The higher the GFN, the smaller the sand 14 grain size. Very low GFN refers to larger sand 14 grain sizes compromising the packing efficiency consisting of larger interstices between the grains and hence resulting in rough casting surfaces. The GFN of the sand 14 is typically between about 50 and about 90, and preferably between about 60 and 80, and more preferably between about 62 and 66.

A binding system (not shown separately from the sand 14) is also used for the sand 14, to hold it together in the mold 10 shape. Any thermally active binding material can be used. One potential binder is a phenolic polymer resin that is melted by a light source emitting light having wavelengths in the IR, visible or UV ranges, or including any of these ranges, to bind and harden each sand layer 12 before machining. The polymer binder is typically from 0.5% to about 10% wt/wt of the sand, and preferably from about 1% to about 4% wt/wt, and more preferably about 3% wt/wt.

Another potential binding system is a furan binding system, though the phenolic polymer is preferred due to its permanence and non-explosive nature. Advantages of the carbon sand 14 and polymer resin system are formation of thinner-walled molds 10 than with other sand systems, less expansion during casting, lighter molds for easier transport and indefinite shelf life.

The layer curing and shaping are then performed with the help of the xy-directional movements of the light source 46, which is typically a high intensity pulsed light source, and the xy-directional movements and optional z-axis, b-axis and c-axis directional movements of the machining tool head 44. The light source 46 will be turned 'ON' in synchronization with the dispensing and leveling of the sand 14. The movement of the leveling system 48 will be restricted to only one direction (for example, the x-direction) and the dimensions of the leveling system 48 will remain the same as the y-directional dimensions of the wall 34 structure.

During or after depositing a generally uniform layer 12 of sand 14, or a portion thereof, the sand 14 is cured using a light source 46. The entire layer 12 of sand 14 may be bound using the application of light or laser energy to activate the binding system in the sand 14, or particular portions 16 of the layer 12 may be cured according to the desired mold 10 shape as set out in the mold 10 design.

In laboratory scale tests, a Xenon Sinteron 2000 photonic light source 46 with a UV to IR wavelength range of 330 nm to 1050 nm was used to prepare and solidify the sand layers 12. However, other light sources 46, as applicable to the specific sand 14 could also be used.

After obtaining a cured layer 16 of sand 14 of desired layer 12 thickness (additive approach), the desired mold 10 shape will be obtained by a machining (subtractive approach). The layer 12 of sand 14 is machined according to the desired mold 10 shape as set out in the mold 10 design, to achieve the final mold 10 shape. The machining tool 44 is mounted on a pneumatic/spring loaded mount platform with an arrangement such that the machining tool 44 will make contact with the sand layer 12 only at the time of machining. The machining tool 44 can also be coupled to the moving tool assembly 38 such that it is movable in the z-direction to define the machining of complex shapes by small step increments in depth. It can also be coupled to the moving tool assembly 38 such that it is movable in the b- and c-directions (about the x-axis and y-axis, respectively) to perform more efficient machining of complex shapes.

In the machining step, the machined sand 14 is not removed from the layer 12, only loosened. Therefore, the cured, machined sand 16 and the loose sand 14 together provide support for the layers 12 of sand 14 that are deposited over the top of the earlier layer 12, even when the earlier layer 12 defines a cavity 20 in the mold 10. Alternatively, non-resin coated sand 14 can be added to the layer 12 and smoothed after machining the cured sand 16, along with the loose (never-cured) sand 14 and the sand 14 loosened by machining to form a solid layer 12 to support the next layer 12 of sand 14 deposited in the build envelope 32. In another alternative, the loose (uncured) sand 14 and the sand 14 loosened by machining can be partially or completely replaced with a non-resin coated sand 14 and smoothed to level the layer 12 in preparation for the next layer 12 of sand 14 to be deposited into the build envelope 32. An entire layer 12 may be cured, to form a cured layer 16, upon which the machining is performed. Alternatively, targeted hardening of specific areas of the layer 12 to form cured portions 16 of a layer 12 could also be performed using curing methods such as laser-activated binding or by limiting light-activated binding to those areas of the layer 12 to be cured.

The selection of the machining tool 44 and light source 46 will be governed by various interrelated parameters including without limitation the desired sand layer 12 thickness, the mechanical bonding strength of the sand 14, the interaction of cured layer 16 with the machining tool 44 during machining, the required cure temperature and cure time for each layer 12, etc.

Milling and cutting operation performances primarily rely on various input parameters such as cutting and feed speeds, direction of feed, machining tool selection, vertical feed rate or depth of the cut, etc. Cutting rates can be defined as being the rate at which a point referenced on cutter passes a reference point on a work piece in calculated amount of time. The cutting speed constants are dependent on cutting tool material, work piece material, machine setup, etc. For the machining and milling operations of sand molds 10, tools for drilling, cutting, milling, grinding, shaping, or a combination of the foregoing, may be utilized, including, but not limited to, flat end milling tools, ball-end milling tools, and drill bits.

To obtain optimum results, the cutting speeds should be kept at half to two thirds of the speeds of comparable end mills using different tool sets. The feed rate can be defined as the rate at which either the material is advanced into cutter or vice-versa. The horizontal feed rates are also dependent on feed directions being characterized as up milling or down milling. In instances of material being fed in opposite directions to the rotation of the milling tool, is known as conventional or up milling. Whereas, the material being fed in the direction of tool rotation is known as climb or down milling. The selection of horizontal feed direction is highly dependent on the backlash elimination capabilities of machine and achieved material surface finish during the machining operation. The horizontal feed rates also influence mechanical properties of the material and obtained surface finish, as excessive feed rates can result in very rough or chipped cutting edges. The vertical feed rates refer to the depth of cut and are governed by the amount of material to be removed from the work piece in single pass-cycle, power available at spindle, rigidity of work piece material, selection of tool, machine setup, etc. By general rule, in case of soft work piece materials, the depth of cut should not exceed half the diameter of the tool and vertical feed rates should be reduced while making deeper cuts. Horizontal and vertical feed rates are preferably from about 1 inch per minute to about 4,000 inches per minute.

To determine the optimum machining parameters for a proposed sand mold 10, the cutting speeds, feed rates and diameter of the machining tool 46 may be determined by conducting machining trials, followed by off-line machining of the molds 10 to obtain functional prototypes.

Sand molds 10 can be coated with refractory coatings to improve castings with many metal chemistries, including, but not limited to, iron, steel, aluminum, brass, copper, lead, zinc, pewter, and combinations and alloys thereof. For aluminum and iron castings (which are common casting materials), the carbon shell sand molds 10 must be coated with refractory coatings (not separately depicted from the mold surfaces 18) to minimize chemical interactions.

Refractory coatings include the application of selected refractory materials to the cured and bonded molds 10. These refractory coatings can be applied by a variety of means, including, but not limited to, brushing, spraying and dry-coating applications. The applications of these refractory materials serve the purposes of: (a) improving the surface finish of mold 10, (b) controlling the heat transfer characteristics at metal-mold 10 interface, (c) altering the venting characteristics of mold 10, and (d) preventing certain defects in casting such as erosion, etc.

In order to impart good surface finish characteristics and minimize or eliminate additional machining and tooling steps in the production of finished parts, smooth mold 10 interfaces are required about the mold cavity 20. The surface smoothness of these interfaces can be altered by the application of refractory coatings, in addition to the machining of these surfaces 18. Identified areas of casting with hindered heat-transfer can be altered by the strategic placement of 'chill spots' with application of 'chill coatings' imparting better heat transfer and thus faster solidification. The mechanical properties of metal castings can also be altered by application of a chill coating to produce a steeper thermal gradient resulting in harder surfaces. Other applications of refractory coatings include the placement of insulating materials in areas of casting where faster solidification is not desired in order to impart required mechanical properties along with minimization of certain casting defects such as misrun or coldshut originating from steeper thermal gradients.

Gas evolution or generation of gases at the mold 10 interface surfaces 18 with flow of molten metal into mold cavities 20, tends to originate various casting defects as the trapped gas always follows the path of least resistance to escape the mold 10. By closing the gas passageways located on the surface of the mold 10 by application of refractory coatings, the gas is forced to exit the system through placement of vents in the mold 10.

High metallostatic pressures and severe turbulence incurring due to flowing molten metal often generate casting defects such as erosion. In order to prevent these defects subjected to the erosion of molding material (sand 14), a refractory coating can be applied to minimize or eliminate penetration of the molten metal into the mold 10.

Refractory coatings include several ingredients such as a refractory material (pigment), a carrying agent (binder), a suspension agent (dispersant), rheology modifiers, surfactants, etc. These coatings can be applied by various methods including without limitation: (a) dipping the mold 10 into the coating formulation, (b) brushing the coating onto mold surfaces 18, (c) spraying the coating onto the mold 10, (d) dry coating the mold with the coating, and (e) strategic placement of coatings onto mold surfaces 18 using inkjet heads or other applicators.

The coating rheology plays a vital role in determination of coating process compatible with the desired coating formulation. After determination of the requirement of the use of refractory coatings from the experimental results as obtained from the casting trials and solidification modeling, corresponding refractory coatings can be identified to impart either chilling or insulating properties or to improve surface smoothness of the mold surfaces 18 according to known methods.

It will be understood by one having ordinary skill in the art that construction of the described invention and other components is not limited to any specific material. Other exemplary embodiments of the invention disclosed herein may be formed from a wide variety of materials, unless described otherwise herein. In this specification and the amended claims, the singular forms "a," "an," and "the" include plural reference unless the context clearly dictates otherwise.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A method of manufacturing a sand mold having a mold shape, comprising the steps of:
    forming a first layer of sand, the first layer having a generally uniform thickness;
    curing at least a portion of the first layer of sand, wherein any portion of first layer that is cured is a first cured portion and any portion of the first layer that is not cured is a first loose portion;
    machining the first cured portion based on the mold shape to remove sand from the first cured portion, wherein the removed sand becomes part of the first loose portion when it is removed from the first cured portion;
    forming a second layer of sand, the second layer having a generally uniform thickness and the second layer being supported by the first layer of sand; and
    repeating the layer-forming, curing, and machining steps until the sand mold has reached the desired mold shape.

2. The method of claim 1, wherein:
    the step of curing at least a portion of the first layer of sand includes curing only a portion of the first layer of sand.

3. The method of claim 1, wherein:
    the first layer is less than about 18 mm thick.

4. The method of claim 3, wherein:
    the first layer is between about 1 mm and about 12 mm thick.

5. The method of claim 1, wherein:
    the step of forming a first layer of sand includes adding a resin-coated sand to a build envelope, the resin-coated sand having a sand component and a binder component.

6. The method of claim 5, wherein:
    the sand component is a carbon shell sand.

7. The method of claim 5, wherein:
the binder component is a phenolic polymer resin.

8. The method of claim 1, wherein:
the sand has a grain fineness number between about 50 and about 90.

9. The method of claim 1, wherein: curing at least a portion of the first layer includes moving a light source in an xy-direction over the first layer of sand with the light source emitting light in the IR range, visible range, or UV range, or a combination thereof.

10. The method of claim 9, wherein:
the step of machining the first cured portion includes at least one of drilling, cutting, milling, or grinding.

11. The method of claim 1, wherein:
the step of machining the first cured portion includes moving a machine tool head along an x-axis, a y-axis, a z-axis, about a b-axis, and about a c-axis.

12. A method of manufacturing a sand mold, comprising the steps of:
determining a desired mold shape;
forming a first layer of sand, the first layer having a generally uniform thickness;
curing at least a portion of the first layer of sand, wherein any portion of first layer that is cured is a first cured portion and any portion of the first layer that is not cured is a first loose portion;
machining the first cured portion based on the desired mold shape to release sand from the first cured portion, wherein such the removed sand becomes part of the first loose portion when it is removed from the first cured portion;
forming a second layer of sand, the second layer having a generally uniform thickness and the second layer being supported by the first layer of sand; and
repeating the layer-forming, curing, and machining steps until the sand mold has reached the desired mold shape; and
adding supplemental sand to the first cured portion and to the first loose portion to level an upper surface of the first layer of sand before adding the second layer of sand.

13. A method of manufacturing a sand mold, comprising the steps of:
determining a desired mold shape;
forming a first layer of sand, the first layer having a generally uniform thickness;
curing at least a portion of the first layer of sand, wherein any portion of first layer that is cured is a first cured portion and any portion of the first layer that is not cured is a first loose portion;
machining the first cured portion based on the desired mold shape to release sand from the first cured portion, wherein such the removed sand becomes part of the first loose portion when it is removed from the first cured portion;
forming a second layer of sand, the second layer having a generally uniform thickness and the second layer being supported by the first layer of sand; and
repeating the layer-forming, curing, and machining steps until the sand mold has reached the desired mold shape; and
removing the first loose portion after machining the first cured portion; and
adding additional sand to the first cured portion to level an upper surface of the first layer of sand before adding the second layer of sand.

14. The method of claim 13, wherein:
the additional sand has a different composition than the first cured portion and the first loose portion.

15. A method of manufacturing a sand mold, comprising the steps of:
determining a desired mold shape;
forming a first layer of sand, the first layer having a generally uniform thickness;
curing at least a portion of the first layer of sand, wherein any portion of first layer that is cured is a first cured portion and any portion of the first layer that is not cured is a first loose portion;
machining the first cured portion based on the desired mold shape to release sand from the first cured portion, wherein such the removed sand becomes part of the first loose portion when it is removed from the first cured portion;
forming a second layer of sand, the second layer having a generally uniform thickness and the second layer being supported by the first layer of sand; and
repeating the layer-forming, curing, and machining steps until the sand mold has reached the desired mold shape; and
removing the first loose portion and a loose portion from each additional layer used to make the sand mold; and
applying a refractory coating to the sand mold.

16. A method of manufacturing a sand mold, comprising the steps of:
determining a desired mold shape;
forming a first layer of sand, the first layer having a generally uniform thickness;
curing at least a portion of the first layer of sand, wherein any portion of first layer that is cured is a first cured portion and any portion of the first layer that is not cured is a first loose portion;
machining the first cured portion based on the desired mold shape to release sand from the first cured portion, wherein such the removed sand becomes part of the first loose portion when it is removed from the first cured portion;
forming a second layer of sand, the second layer having a generally uniform thickness and the second layer being supported by the first layer of sand; and
repeating the layer-forming, curing, and machining steps until the sand mold has reached the desired mold shape; and;
applying a refractory coating to the sand mold, wherein the applying includes at least one of dipping the sand mold into a coating material, brushing the coating material onto the sand mold, spraying the coating material onto the sand mold, dry coating the sand mold with the coating material, and placing the coating onto a desired portion of the sand mold.

* * * * *